(12) United States Patent
Yamamoto et al.

(10) Patent No.: US 7,813,925 B2
(45) Date of Patent: Oct. 12, 2010

(54) STATE OUTPUT PROBABILITY CALCULATING METHOD AND APPARATUS FOR MIXTURE DISTRIBUTION HMM

(75) Inventors: Hiroki Yamamoto, Yokohama (JP); Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 11/398,620

(22) Filed: Apr. 6, 2006

(65) Prior Publication Data
US 2006/0229871 A1    Oct. 12, 2006

(30) Foreign Application Priority Data
Apr. 11, 2005   (JP)   ............... 2005-113954

(51) Int. Cl.
*G10L 15/00*   (2006.01)
*G10L 15/14*   (2006.01)
(52) U.S. Cl. .................. 704/240; 704/231; 704/236; 704/239; 704/256
(58) Field of Classification Search .................. 704/231, 704/236, 239, 240, 256
See application file for complete search history.

(56) References Cited

U.S. PATENT DOCUMENTS

| | | | | |
|---|---|---|---|---|
| 4,214,125 A | * | 7/1980 | Mozer et al. ................ | 704/268 |
| 4,624,008 A | * | 11/1986 | Vensko et al. ............... | 704/253 |
| 4,977,598 A | * | 12/1990 | Doddington et al. ........ | 704/255 |
| 5,018,201 A | * | 5/1991 | Sugawara ................... | 704/252 |
| 5,047,952 A | * | 9/1991 | Kramer et al. .............. | 704/271 |
| 5,353,377 A | * | 10/1994 | Kuroda et al. ............ | 704/256.1 |
| 5,579,435 A | * | 11/1996 | Jansson ..................... | 704/233 |
| 5,602,959 A | * | 2/1997 | Bergstrom et al. .......... | 704/205 |
| 5,621,827 A | | 4/1997 | Uchiyama et al. .......... | 382/307 |
| 5,640,490 A | * | 6/1997 | Hansen et al. .............. | 704/254 |
| 5,677,988 A | * | 10/1997 | Takami et al. .............. | 704/256 |
| 5,774,847 A | * | 6/1998 | Chu et al. ................... | 704/237 |
| 5,787,396 A | * | 7/1998 | Komori et al. ............. | 704/256 |
| 5,794,198 A | * | 8/1998 | Takahashi et al. .......... | 704/256 |

(Continued)

FOREIGN PATENT DOCUMENTS

JP        968996        8/1979

(Continued)

OTHER PUBLICATIONS

Rabiner, L. et al., "Fundamentals of Speech Recognition", PTR Prentice Hall (Signal Processing Series), 1993.

(Continued)

*Primary Examiner*—Eric Yen
(74) *Attorney, Agent, or Firm*—Fitzpatrick, Cella, Harper & Scinto

(57) ABSTRACT

When adjacent times or the small change of an observation signal is determined, a distribution which maximizes the output probability of a mixture distribution does not change at a high possibility. By using this fact, when obtaining the output probability of the mixture distribution HMM, a distribution serving as a maximum output probability is stored. When adjacent times or the small change of the observation signal is determined, the output probability of the stored distribution serves as the output probability of the mixture distribution. This can reduce the output probability calculation of other distributions when calculating the output probability of the mixture distribution, thereby reducing the calculation amount required for output probabilities.

3 Claims, 15 Drawing Sheets

U.S. PATENT DOCUMENTS

| | | | | |
|---|---|---|---|---|
| 5,828,998 | A * | 10/1998 | Iwahashi | 704/236 |
| 5,933,806 | A * | 8/1999 | Beyerlein et al. | 704/256.8 |
| 5,950,159 | A * | 9/1999 | Knill | 704/251 |
| 5,995,928 | A * | 11/1999 | Nguyen et al. | 704/251 |
| 6,009,390 | A * | 12/1999 | Gupta et al. | 704/240 |
| 6,029,130 | A * | 2/2000 | Ariyoshi | 704/248 |
| 6,064,958 | A * | 5/2000 | Takahashi et al. | 704/243 |
| 6,216,107 | B1 * | 4/2001 | Rydbeck et al. | 704/500 |
| 6,292,777 | B1 * | 9/2001 | Inoue et al. | 704/230 |
| 6,594,393 | B1 * | 7/2003 | Minka et al. | 382/218 |
| 6,687,665 | B1 * | 2/2004 | Oda et al. | 704/207 |
| 6,697,782 | B1 * | 2/2004 | Iso-Sipila et al. | 704/275 |
| 6,721,711 | B1 * | 4/2004 | Hoshiai | 704/500 |
| 6,789,061 | B1 * | 9/2004 | Fischer et al. | 704/240 |
| 6,813,606 | B2 * | 11/2004 | Ueyama et al. | 704/270.1 |
| 6,895,380 | B2 * | 5/2005 | Sepe, Jr. | 704/275 |
| 7,058,580 | B2 * | 6/2006 | Ueyama et al. | 704/270.1 |
| 7,167,545 | B2 * | 1/2007 | Plannerer et al. | 379/88.01 |
| 7,184,951 | B2 * | 2/2007 | Royle et al. | 704/205 |
| 7,269,556 | B2 * | 9/2007 | Kiss et al. | 704/245 |
| 7,349,850 | B2 * | 3/2008 | Shimomura et al. | 704/270 |
| 7,356,466 | B2 * | 4/2008 | Min et al. | 704/240 |
| 7,460,995 | B2 * | 12/2008 | Rinscheid | 704/243 |
| 7,480,617 | B2 * | 1/2009 | Chu et al. | 704/256 |
| 7,487,083 | B1 * | 2/2009 | Zhang | 704/214 |
| 7,499,858 | B2 * | 3/2009 | Wolfel | 704/255 |
| 2001/0012994 | A1 * | 8/2001 | Komori et al. | 704/231 |
| 2001/0029444 | A1 * | 10/2001 | Rydbeck et al. | 704/200 |
| 2003/0040919 | A1 * | 2/2003 | Miyazawa et al. | 704/500 |
| 2003/0158729 | A1 * | 8/2003 | Royle et al. | 704/211 |
| 2004/0015344 | A1 * | 1/2004 | Shimomura et al. | 704/200 |
| 2004/0039572 | A1 * | 2/2004 | Kiss et al. | 704/242 |
| 2005/0192803 | A1 * | 9/2005 | Miyazawa | 704/240 |

FOREIGN PATENT DOCUMENTS

| | | |
|---|---|---|
| JP | 5-197388 | 6/1993 |
| JP | 9127977 | 5/1997 |
| JP | 2983364 | 9/1999 |

OTHER PUBLICATIONS

H. Ney et al., "Phoneme modeling using continuous mixture densities", Proc. ICASSP88, pp. 437-440, 1988.

Office Action dated Aug. 13, 2007 in JP 2005-113954.

* cited by examiner

CALCULATING METHOD (1) FOR LOGARITHMIC OUTPUT PROBABILITY B OF STATE s FOR OBSERVATION SIGNAL O (t)

CALCULATING METHOD (2) FOR LOGARITHMIC OUTPUT PROBABILITY B OF STATE s FOR OBSERVATION SIGNAL O (t)

F I G. 9
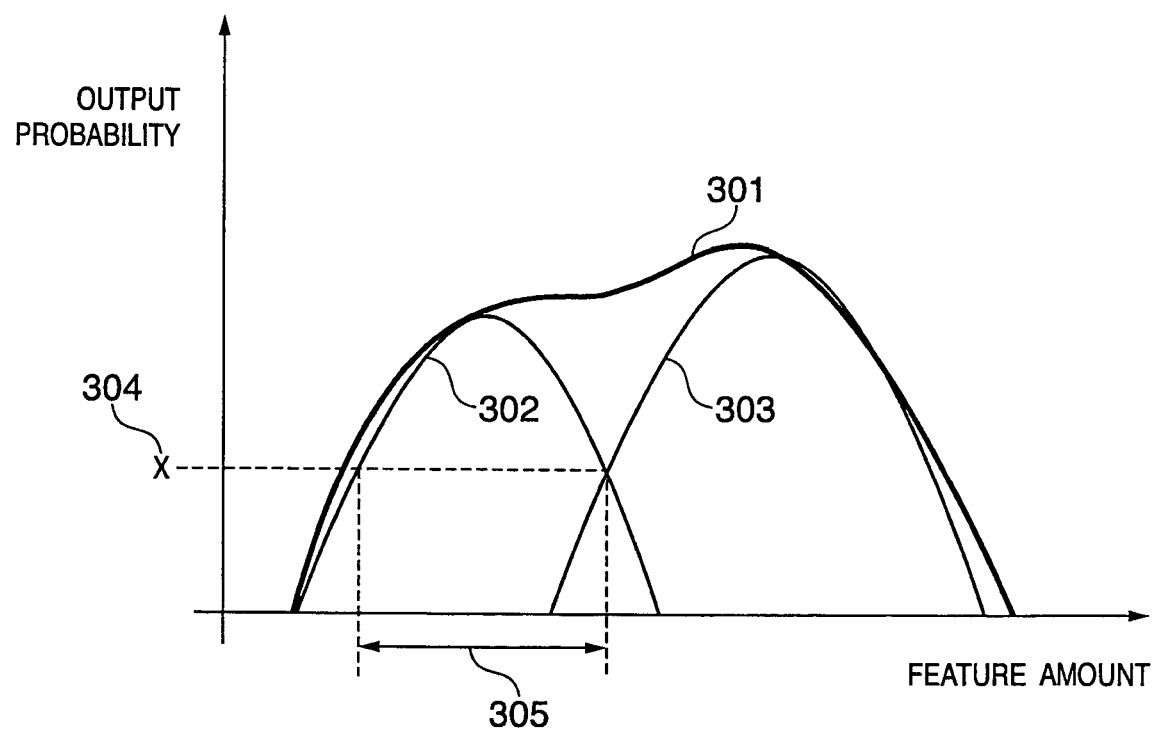

CALCULATING METHOD (3) FOR LOGARITHMIC OUTPUT PROBABILITY B OF STATE s FOR OBSERVATION SIGNAL O (t)

CALCULATING METHOD (4) FOR LOGARITHMIC OUTPUT PROBABILITY B OF STATE s FOR OBSERVATION SIGNAL O (t)

CALCULATING METHOD (5) FOR LOGARITHMIC OUTPUT PROBABILITY B OF STATE s FOR OBSERVATION SIGNAL O (t)

FIG. 13

CALCULATION COUNT OF B'(s, m, O(t))

|  | CONVENTIONAL METHOD | PRESENT INVENTION |
|---|---|---|
| FRAME | | |
| t | M TIMES | M TIMES |
| t+1 | M TIMES | 1 TIMES |
| t+2 | M TIMES | 1 TIMES |
| : | | |
| t+(N−1) | M TIMES | 1 TIMES |
| TOTAL COUNT | M×N TIMES | M+N−1 TIMES |
| AVERAGE COUNT PER FRAME | M TIMES | (M+N−1)/N TIMES |

F I G. 14

| NUMBER OF MIXTURES | TECHNIQUE | RECOGNITION RATE | PROCESSING TIME |
|---|---|---|---|
| 2 | CONVENTIONAL METHOD | 94.46% | 1.00 |
| | PRESENT INVENTION | 94.29% (−0.17%) | 0.86 (14% REDUCED) |
| 8 | CONVENTIONAL METHOD | 96.79% | 1.00 |
| | PRESENT INVENTION | 96.79% (±0%) | 0.69 (31% REDUCED) |

STATE OUTPUT PROBABILITY CALCULATING METHOD AND APPARATUS FOR MIXTURE DISTRIBUTION HMM

FIELD OF THE INVENTION

The present invention relates to a state output probability calculating method and apparatus for a mixture distribution HMM (Hidden Markov Model).

BACKGROUND OF THE INVENTION

An HMM is suitable for expressing a time-series signal and is widely used in the fields of pattern recognition which processes a time variant signal as in speech recognition and moving image recognition.

An HMM is generally formed from a plurality of states and expressed as an output probability which outputs a signal in each state and a transition probability between states. FIG. 2 shows an example of an HMM formed from three states. Referring to FIG. 2, s is a state index; a(i,j), a transition probability of transition from the ith state to the jth state; and b(i,o), an output probability at which a signal o is output in the state i. In pattern recognition, recognition target events are modeled by a plurality of HMMs. When a time-series signal o(t) (t=1 to T) is observed, a output probability of each event is obtained from the transition and output probabilities of the corresponding HMMs. An event having the highest probability is obtained as the recognition result.

The details of HMMs and pattern recognition methods using HMMs have been introduced by many references, and a detailed description thereof will be omitted. For example, speech recognition using an HMM is introduced in detail in Lawrence Rabiner and Biing-Hwang Juang, "Fundamentals of Speech Recognition", Englewood Cliffs N.J.: PTR Prentice Hall (Signal Processing Series), 1993.

Speech recognition often uses a continuous mixture distribution HMM representing the output probability distribution as the sum of a plurality of continuous distributions. An example is shown in FIG. 3. The output probability distribution (301) of HMM states is represented by the sum of distribution 1 (302) and distribution 2 (303). An output probability value b(O) at which a signal O is observed is obtained from b(O)=b'(1,O)+b'(2,O) using the output probability b'(1,O) obtained from distribution 1 (302) and the output probability b'(2,O) obtained from distribution 2 (303).

FIG. 3 exemplifies a one-dimensional observation signal for the descriptive simplicity. In pattern recognition such as speech recognition, a multi-dimensional feature vector is generally used as an observation signal. An output probability distribution is defined as a multidimensional continuous mixture distribution. A Gaussian distribution is often used because of simple calculation. The output probability of the mixture distribution is calculated as the weighted sum of output probabilities of a plurality of Gaussian distributions.

The number of mixture components (number of mixtures) in FIG. 3 is two. In order to build a high performance model, the number of mixture must increase to precisely express the output probability distribution.

The actual output probability of a mixture distribution using, e.g., an diagonal Gaussian distribution is calculated by:

$$b'(m, O) = \prod_{k=1}^{K} \left(\frac{1}{2\pi\sigma^2(m, k)}\right)^{\frac{1}{2}} \exp\left(-\frac{1}{2}\sum_{k=1}^{K} \frac{(o(k) - \mu(m, k))^2}{2\sigma^2(m, k)}\right) \quad (1)$$

$$b(O) = \sum_{m=1}^{M} w(m) \cdot b'(m, O) \quad (2)$$

where
K: the number of dimensions of feature vector (observation signal) used
O={o(1), o(2), ..., o(K)}: observation signal (K-dimensional vector)
b(O): the output probability of the mixture distribution
b(m,O): the output probability of the distribution m
M: the number of mixtures
w(m): the weight of the distribution m
$\sigma^2(m,k)$: the k-dimensional variance of the distribution m
$\mu(m,k)$: the k-dimensional mean of the distribution m When an output probability is actually calculated on a computer, the logarithmic value B'(m,O) of the weighted output probability is generally calculated by:

$$B'(m, O) = \ln(w(m) \cdot b'(m, O)) \quad (3)$$

$$= \ln(w(m)) + \frac{1}{2}\sum_{k=1}^{K} \ln\left(\frac{1}{2\pi\sigma^2(m, k)}\right) - \frac{1}{2}\sum_{k=1}^{K} \frac{(o(k) - \mu(m, k))^2}{\sigma^2(m, k)}$$

$$= C(m) - \frac{1}{2}\sum_{k=1}^{K} \frac{(o(k) - \mu(m, k))^2}{\sigma^2(m, k)}$$

$$C(m) = \ln(w(m)) + \frac{1}{2}\sum_{k=1}^{K} \ln\left(\frac{1}{2\pi\sigma^2(m, k)}\right)$$

The logarithmic value is used to prevent an underflow, and the computation load of the computer can advantageously be reduced because the term of power calculation in equation (1) is expanded. The constant part (C(m)) independent of the observation signal can be calculated in advance. The logarithmic value B(O) of the output probability of the mixture distribution as the final result can be given by:

$$B(O) = \ln(b(O)) \quad (4)$$

$$= \ln\left(\sum_{m=1}^{M} w(m) \cdot b'(m, O)\right)$$

$$= \ln\left(\sum_{m=1}^{M} \exp\{\ln(w(m) \cdot b'(m, O))\}\right)$$

$$= \ln\left(\sum_{m=1}^{M} \exp(B'(m, O))\right)$$

In equation (4), after the weighted logarithmic output probability value of each distribution is obtained, the power calculation and the natural logarithmic operation are still necessary to calculate the output probability of the mixture distribution. To simplify the above calculations, the approximation methods of the output probability calculation are disclosed in H. Ney et al., "Phoneme modeling using continuous mixture densities", Proc. ICASSP88, pp. 437-440, 1988 (to be referred to as Ney hereinafter) and Japanese Patent No. 2983364.

In Ney, the output probability of the mixture distribution is approximated using the maximum output probability of the output probabilities of the respective distributions instead of calculating the sum of the output probabilities of the respective distributions, thereby reducing the calculation amount. That is, in place of equation (2), the output probability of the mixture distribution is calculated by:

$$b(O) = \max_{m=1}^{M} w(m) \cdot b'(m, O) \quad (5)$$

Japanese Patent No. 2983364 discloses an example in which a technique as in Ney is applied to an arc-emission HMM (Mealy machine).

When the approximation of equation (5) is used for equation (4), the logarithmic output probability of the mixture distribution can be simplified as:

$$\begin{aligned} B(O) &= \ln(b(O)) \\ &= \ln\left(\max_{m=1}^{M} w(m) \cdot b'(m, O)\right) \\ &= \max_{m=1}^{M} \ln(w(m) \cdot b'(m, O)) \\ &= \max_{m=1}^{M} B'(m, O) \end{aligned} \quad (6)$$

The above conventional technique is excellent because the computation cost is reduced by the approximation while degradation in recognition accuracy by the approximation errors is little. However, output probability calculation of the mixture distribution HMM still requires a large amount of calculation cost.

SUMMARY OF THE INVENTION

In view of the above problems in the conventional art, the present invention has an object to further reduce the amount of output probability calculation of a mixture distribution HMM.

In one aspect of the present invention, a state output probability calculating method for a mixture distribution HMM, executed by a pattern recognition apparatus which performs pattern recognition of an observation signal by using a mixture distribution HMM in which an event of a recognition target stored in a memory is modeled, is provided. The method comprises a first output probability calculating step of calculating weighted output probabilities of all distributions belonging to a state for a first observation signal, obtaining a maximum value of the weighted output probabilities and a maximum distribution which outputs the maximum value, and defining the obtained maximum value as an output probability of a mixture distribution; a maximum distribution storage step of storing, in the memory, information which specifies a maximum distribution obtained in the first output probability calculating step; and a second output probability calculating step of, when a predetermined condition is satisfied, calculating a weighted output probability of the maximum distribution stored in the memory in the maximum distribution storage step, instead of the first output probability calculating step, for a second observation signal observed after the first observation signal, and defining the calculated weighted output probability as the output probability of the mixture distribution.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a graph for explaining a technique for calculating the output probability of a mixture distribution HMM according to the third embodiment of the present invention;

FIG. 13 is a table showing the comparison results of calculation counts of logarithmic output probabilities B'(s,m,O (t)) of all distributions m of states s in the conventional method and the method of the present invention;

FIG. 14 is a table showing the experimental results of recognition rates and processing times in speech recognition to which the present invention is applied.

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

Figure 4:
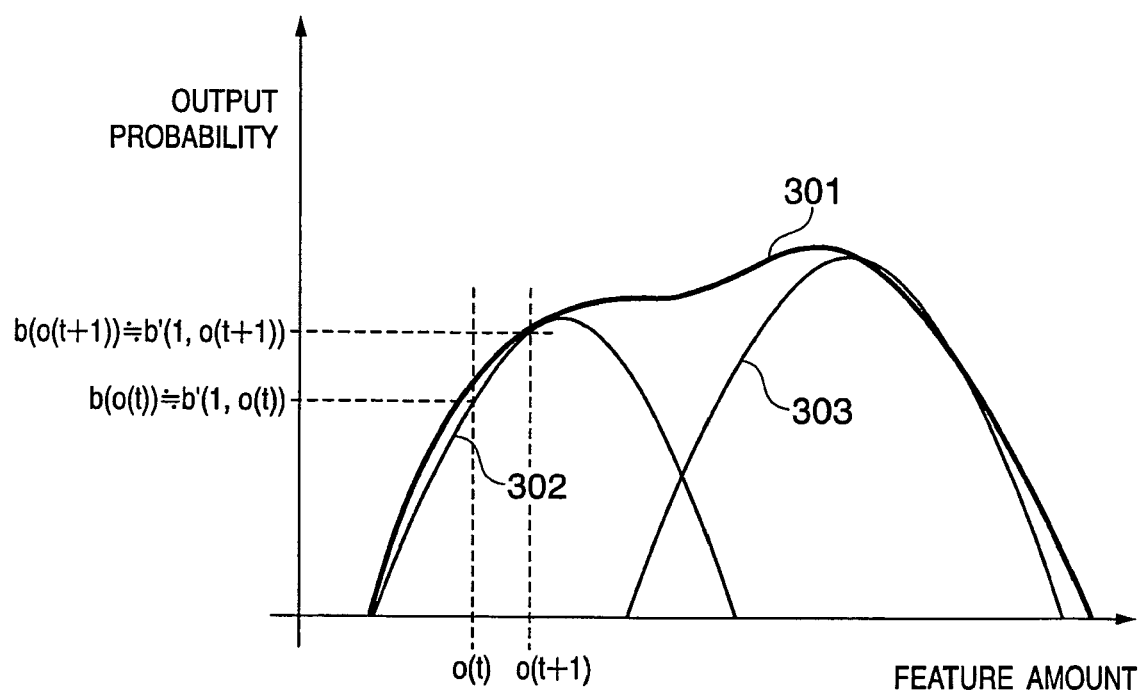
FIG. 4 is a graph for explaining a technique for calculating the output probability of a mixture distribution HMM of the present invention.

When an observation signal changes moderately as a function of time, a distribution serving as a maximum output probability for a signal O(t) observed at given time t can be a maximum output probability at a high possibility even in an observation signal O(t+1) observed at the next time t+1. That is, when the change of the observation signal is small, the distribution serving as the maximum output probability does not change. FIG. 4 shows a simple example. When an approximation operation by equation (5) is applied to FIG. 4, an output probability b(O(t)) of the mixture distribution for an observation signal O(t) can be approximated by an output probability value b'(1,O(t)) of distribution 1 (301) at which the O(t) output probability is high. When an observation signal O(t+1) at the next time t+1 has rarely changed with respect to O(t), as shown in FIG. 4, the output probability b(O(t+1)) of the mixture distribution for O(t+1) can also be approximated by the output probability value b'(1,O(t+1)) of distribution 1.

The present invention uses a high possibility that a distribution for maximizing the output probability of a mixture distribution (called maximum distribution hereinafter) does not change when the change of an observation signal is small. For example, when calculating the output probability of each state of the mixture distribution HMM, a distribution serving as a maximum output probability is stored for each state. When the change of an observation signal is determined to be small, the output probability of the stored distribution is given as the output probability. With this arrangement, the calculations for the output probabilities of other distributions in calculating a target output probability of a mixture distribution can be omitted, thereby reducing the calculation amount required for output probability.

In this embodiment, assume that the change of an observation signal as a function of time is small within a short period of time, and that the same distribution becomes a maximum output probability for the adjacent times. A method of calculating a distribution which maximizes an output probability, and calculating, for a predetermined period of time, only the output probability of this distribution will be described below.

Although this embodiment exemplifies a case in which the present invention is applied to a speech recognition apparatus, the present invention is, of course, applicable to a pattern recognition apparatus (e.g., an image recognition apparatus) which requires the output probability calculation of a mixture distribution HMM.

This embodiment also exemplifies the logarithmic value calculation of an output probability, but is also applicable to a calculation except for the logarithmic value.

Figure 1:
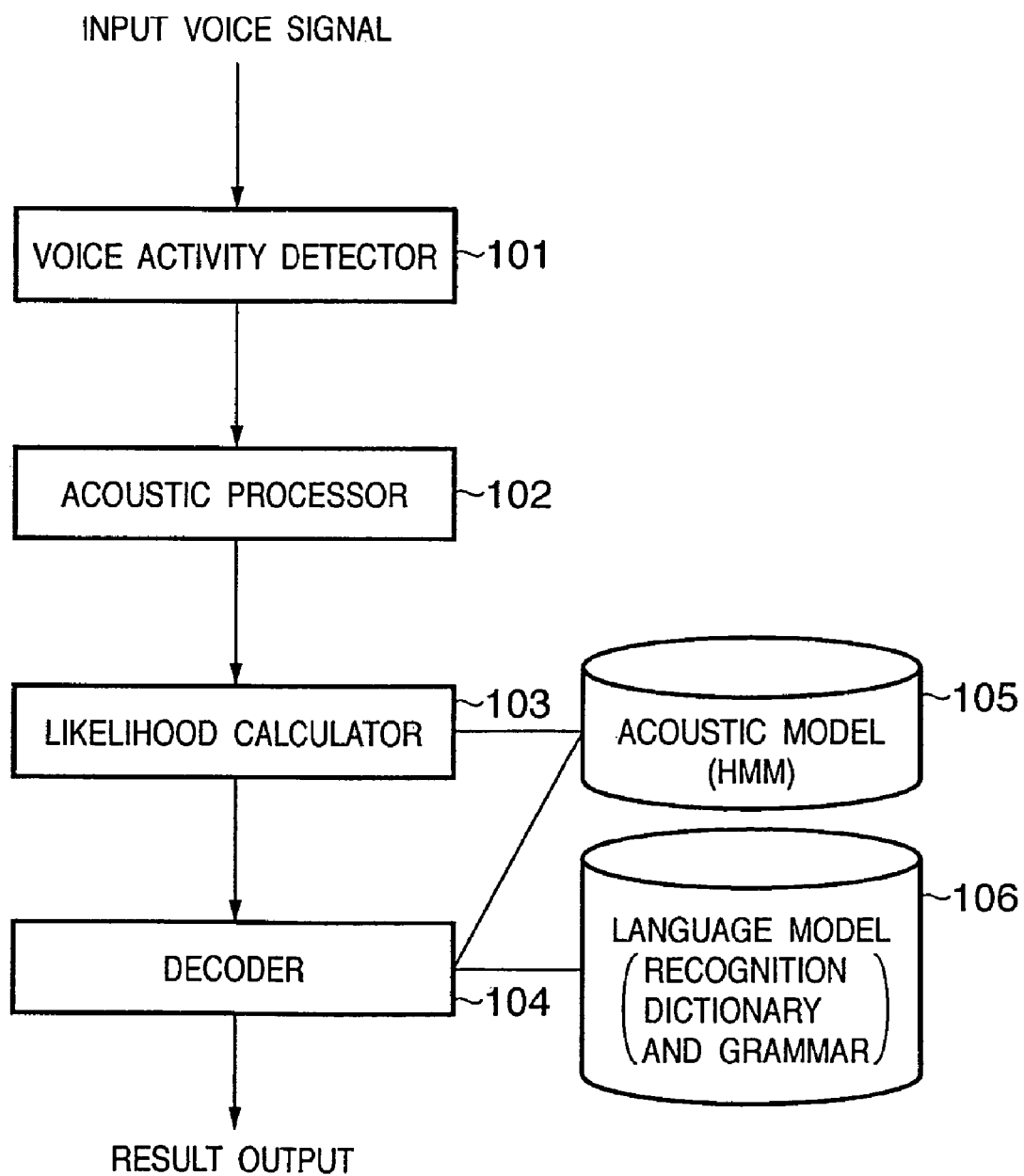
FIG. 1 is a functional block diagram of a speech recognition apparatus according to an embodiment of the present invention.
Figure 2:
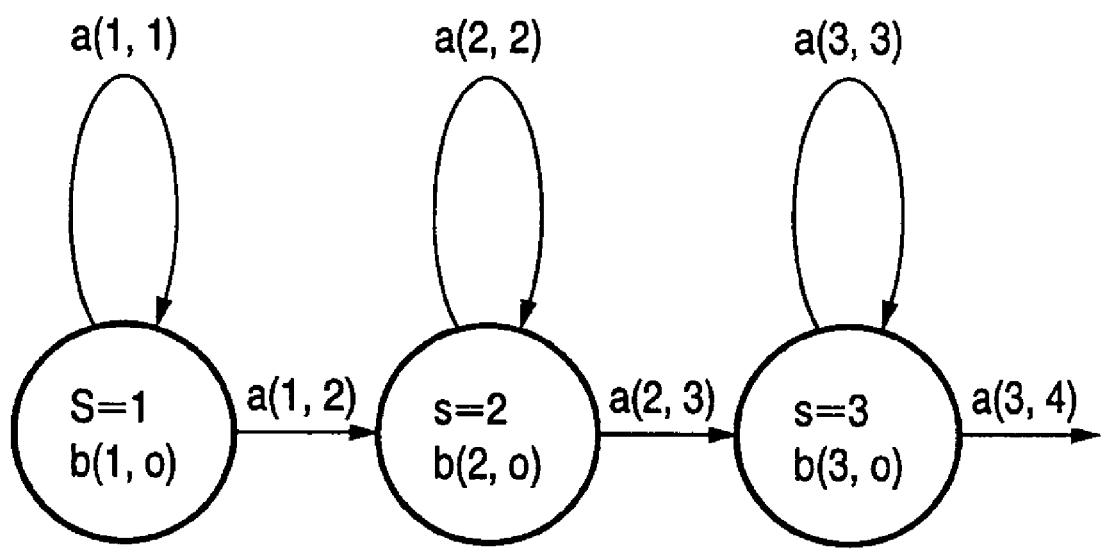
FIG. 2 is a view showing an example of a 3-state HMM.
Figure 3:
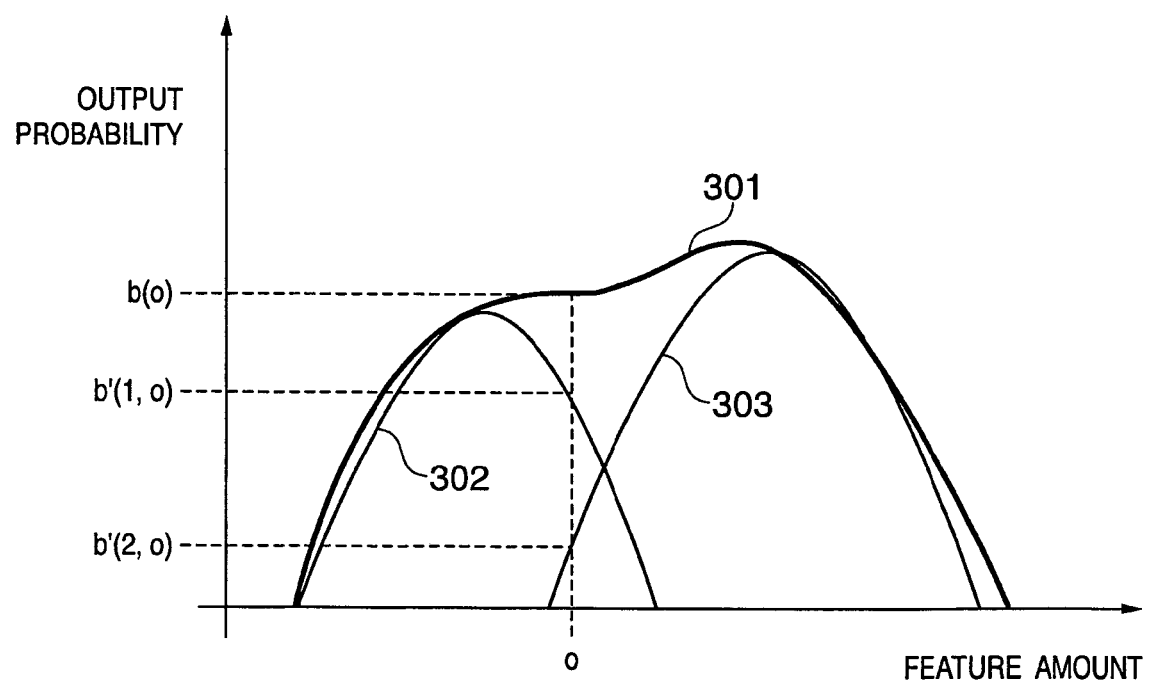
FIG. 3 is a graph for explaining a technique for calculating the output probability of a conventional mixture distribution HMM.

FIG. 1 is a functional block diagram of a speech recognition apparatus according to this embodiment. A voice activity detector 101 detects a speech portion from an input voice signal. An acoustic processor 102 calculates a K-dimensional feature vector O(t)={o(t,1), ..., o(t,k), ..., o(t,K)} ($1 \leq t \leq T$) such as an LPC (Linear Predictive Coding) cepstrum or mel-cepstrum coefficient from the voice signal of the speech portion detected by the voice activity detector 101. A likelihood calculator 103 refers to the feature vector O(t) and an acoustic model (HMM) 105 as the observation signal and calculates a logarithmic output probability B(s,O(t)) ($1 \leq s \leq S$) (where s is the state index) of a state s of the mixture distribution HMM, which is required in decoding process executed by a decoder 104. The decoder 104 forms an HMM state sequence required for speech recognition in accordance with the acoustic model 105 and a language model 106 which records an acceptable grammar and a recognition dictionary listing recognition target words. The decoder 104 then refers to the HMM state transition probability and the logarithmic output probability of each state calculated by the likelihood calculator 103 and calculates a cumulative value of the output probabilities for each HMM state sequence using, e.g., a Viterbi algorithm. The decoder 104 determines the HMM state sequence with the maximum cumulative value as the recognition result.

A case will be explained in which an output probability calculating technique of a mixture distribution HMM according to the present invention is applied to the speech recognition apparatus with the above arrangement.

Figure 5:
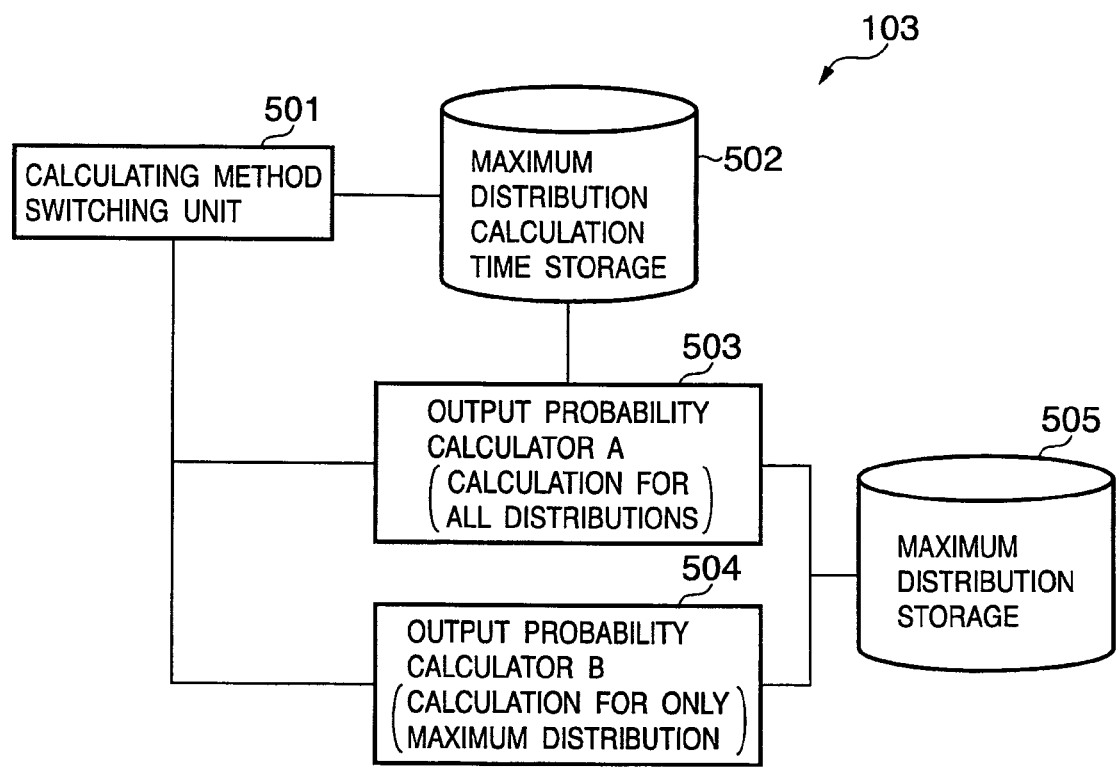
FIG. 5 is a functional block diagram showing the detailed arrangement of a likelihood calculator according to the first and third embodiments of the present invention.

FIG. 5 is the detailed functional block diagram of the likelihood calculator 103 of this embodiment. As shown in FIG. 5, the calculator 103 includes an output probability calculator A (503) and an output probability calculator B (504) which have different output probability calculating methods. The output probability calculator A calculates logarithmic output probabilities of all distributions of a mixture probability and defines the maximum value as the logarithmic output probability of the state. That is, the calculator A performs the calculation by equation (6). Information (e.g., an index) which specifies the maximum distribution is then stored in a maximum distribution storage 505. Time at which this calculation was performed is stored in a maximum distribution calculation time storage 502. The other output probability calculator B calculates the logarithmic output probability of the distribution stored in the maximum distribution storage 505 and defines the storage value as the logarithmic output probability.

A calculating method switching unit 501 performs condition determination for switching between the output probability calculating methods. The output probability calculator A is selected when an output probability is calculated for the first time upon activation of the speech recognition apparatus or when a predetermined period of time has elapsed from the time stored in the maximum distribution calculation time storage 502. The output probability calculator B is selected when a predetermined period time has elapsed upon the latest calculation of the maximum distribution.

Figure 6:
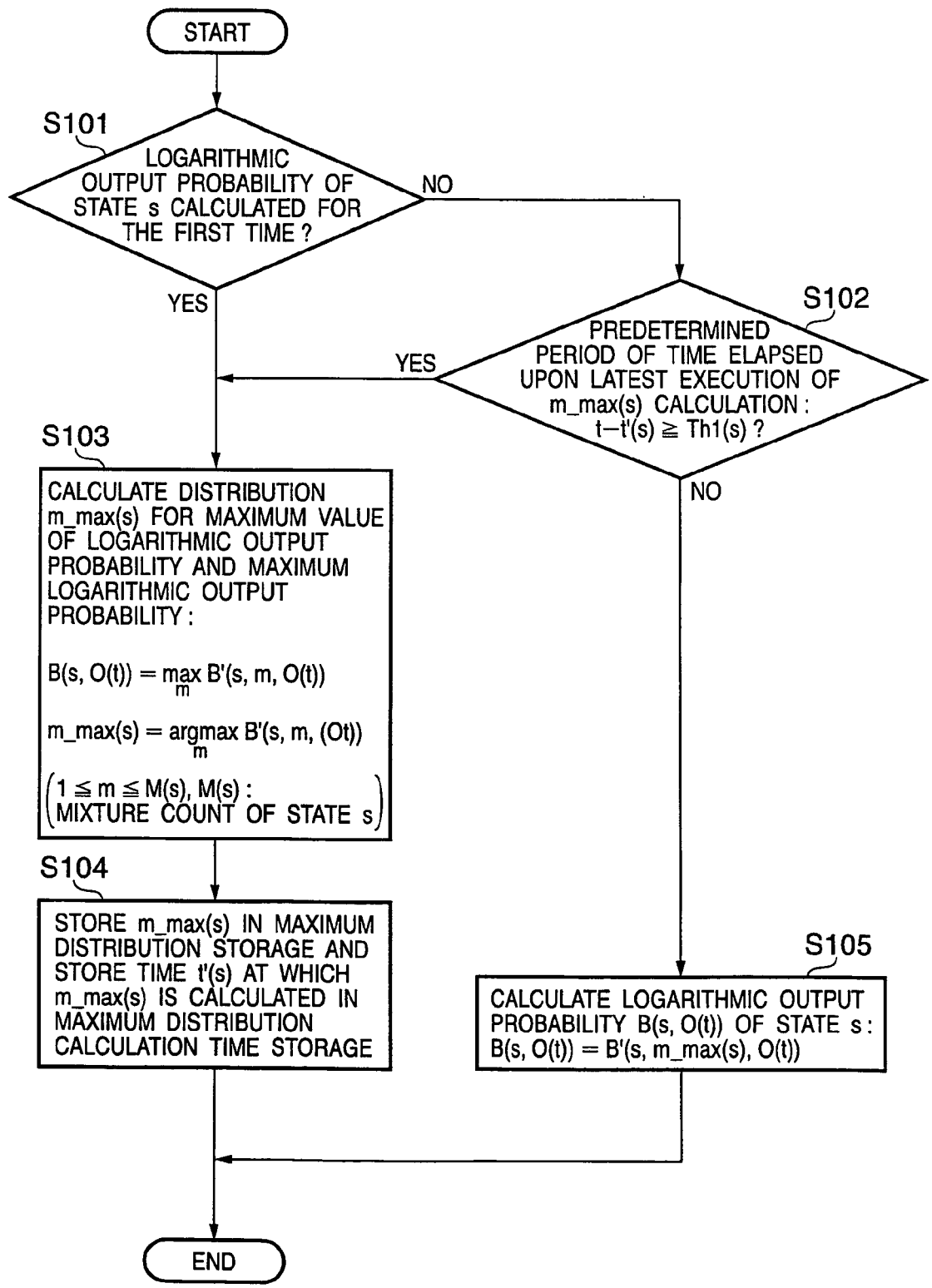
FIG. 6 is a flowchart showing a sequence of calculating an output probability according to the first embodiment of the present invention.

The sequence of calculating a logarithmic output probability B(s,O(t)) of a state s for a signal vector O(t) observed at time t will be described with reference to the flowchart in FIG. 6.

When a logarithmic output probability in a state s is calculated for the first time upon activation of the speech recognition apparatus (YES in step S101), the logarithmic output probabilities B'(s,m,O(t)) of all distributions m ($1 \leq m \leq M(s)$) where M(s) is the number of mixtures of the states s) of the states s are calculated. The maximum value of the logarithmic output probabilities is given as the logarithmic output probability B(s,O(t)) of the state s (step S103). At this time, an index m serving as information which specifies the distribution representing the maximum logarithmic output probability is given as m_max(s). This value is stored in the maximum distribution storage 505, and time t'(s) at which the maximum distribution of the state s was calculated is stored in the maximum distribution calculation time storage 502 (step S104).

When the logarithmic output probability of the state s is not calculated for the first time (NO in step S101), the next processing is performed. When a predetermined period of time (Th1($s$)) from the time t'(s) as the current time t at which the maximum distribution m_max(s) of the state s is calculated has not elapsed (NO in step S102), it is assumed that the maximum distribution of the state s becomes m_max(s). The logarithmic output probability B'(s,m_max(s),O(t)) of the distribution m_max(s) is given as the logarithmic output probability B(s,O(t)) of the state s (step S105).

In step S102, when the current time has elapsed from t'(s) by a predetermined period of time (Th1($s$)), the maximum distribution may greatly change from the time when the observation signal calculates the maximum distribution. A distribution in which the logarithmic output probability is maximum may be changed. For this reason, the logarithmic output probabilities of all distributions and the maximum distribution must be recalculated to update t'(s) and m_max(s) (step S103).

With the above processing, the condition determinations in steps S101 and S102 are executed by the calculating method switching unit 501. The calculation of the maximum value of the logarithmic output probability in step S103 and the updating of the maximum distribution calculation time in step S104 are executed by the output probability calculator A (503). The calculation of the logarithmic output probability of the distribution stored in step S105 is executed by the output probability calculator B (504). The distribution m_max(s) obtained in step S103 is stored in the maximum distribution storage 505 as a distribution which gives the maximum output probability of the state s. The time t'(s) at which the maximum distribution of the state s updated in step S104 is calculated is stored in the maximum distribution calculation time storage 502.

The calculations of B'(s,m,O(t)) in steps S103 and S105 are identical because the state s and the time t are added to equation (3). Equation (3) is rewritten by adding these suffixes:

$$B'(s, m, O(t)) = C(s, m) - \frac{1}{2} \sum_{k=1}^{K} \frac{(o(t, k) - \mu(s, m, k))^2}{\sigma^2(s, m, k)} \quad (7)$$

$$C(s, m) = \ln(w(s, m)) + \frac{1}{2} \sum_{k=1}^{K} \ln \frac{1}{2\pi\sigma^2(s, m, k)}$$

where

O(t)={o(t,1), . . . o(t,k), . . . o(t,K)}: the observation signal (K-dimensional vector) at time t w(s,m): the weight for the distribution m of the state s $\sigma^2$(s,m,k): the k-dimensional variance of the distribution m of the state s μ(s,m,k): the k-dimensional average of the distribution m of the state s When the distribution m_max(s) serving as the maximum output probability for the mixture distribution of a given state s by calculating the output probabilities described above is once calculated, the calculations of B'(s,m,O(t)) except for m_max(s) can be omitted for the period of Th1($s$)−1. For example, the calculations of B'(s,m,O(t)) can be omitted (M−1) times during the (N−1) frames when the number of mixtures M(s) of the state s is given as M and Th1($s$)=N frames given when the unit of Th1($s$) is defined as a frame. Therefore, the (M−1)×(N−1) calculations of B'(s,m,O(t)) can be omitted as a whole. The comparison results of the B'(s,m,O(t)) calculation counts between the conventional method and the method of the present invention are shown in FIG. 13.

For the reference, the results of speech recognition experiments conducted by the present inventors to check the effects of the present invention will be described below.

540 utterances from 14 men and females were examined for the recognition rates upon speech recognition using the mixture distribution HMM using 800 states and for the speech recognition processing times when the present invention was applied and not applied. The number of recognition target words is 100. To compare the differences in effects by the different number of mixtures, two types of HMMs having 2 mixtures and 8 mixtures were used. Th1($s$) in this embodiment was constantly 2 regardless of the HMM states. The experimental results are shown in FIG. 14.

The table in FIG. 14 shows the number of mixtures, techniques (conventional method/method of the present invention), recognition rates, and processing times from the left column. Numerical values in the parentheses represent the differences in recognition rates between the conventional method and the method of the present invention. The processing time of the present invention is normalized by the processing time of the conventional method.

The experimental results indicate that the processing time of the present invention is made shorter than that of the conventional method while the recognition rate is kept unchanged. The experimental results also indicate that the processing time can further be reduced when the number of mixtures increases.

Second Embodiment

According to the present invention, when a distribution (maximum distribution) in which an output probability is maximum is to be obtained, its distribution is stored. When the change of an observation signal in calculating subsequent output probabilities is small, the output probability of the stored maximum distribution is used as the output probability to omit output probability calculations of other distributions, thereby reducing the amount of calculation. In the second embodiment, distances between observation signals observed at different times are calculated. When a distance is less than a threshold value, the change of the corresponding observation signal is determined to be small. That is, when the distance between the current observation signal and the observation signal at time when the maximum distribution is obtained is less than the threshold value, the output probability of the stored maximum distribution is given as the output probability of the mixed distribution.

Figure 7:
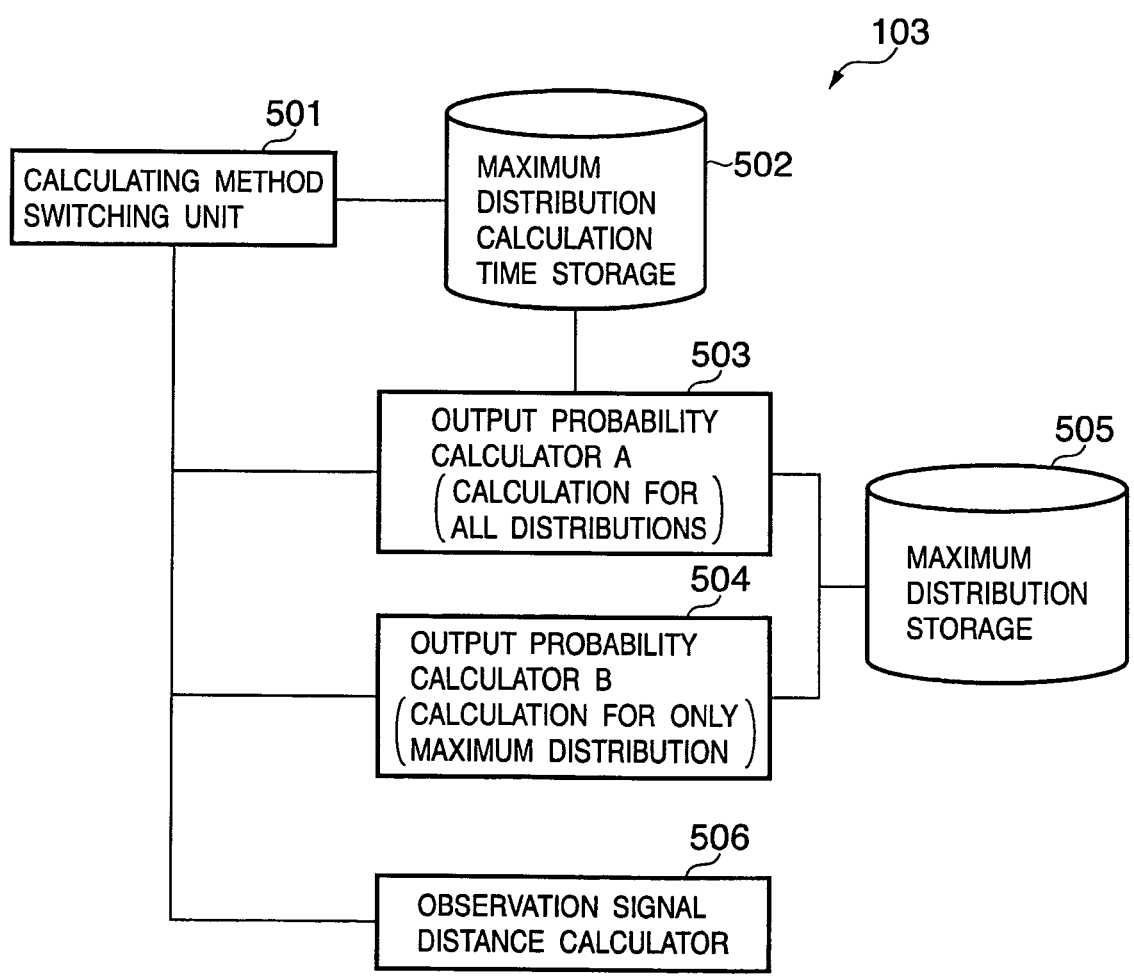
FIG. 7 is a functional block diagram showing the detailed arrangement of a likelihood calculator according to the second and fourth embodiments of the present invention.
Figure 8:
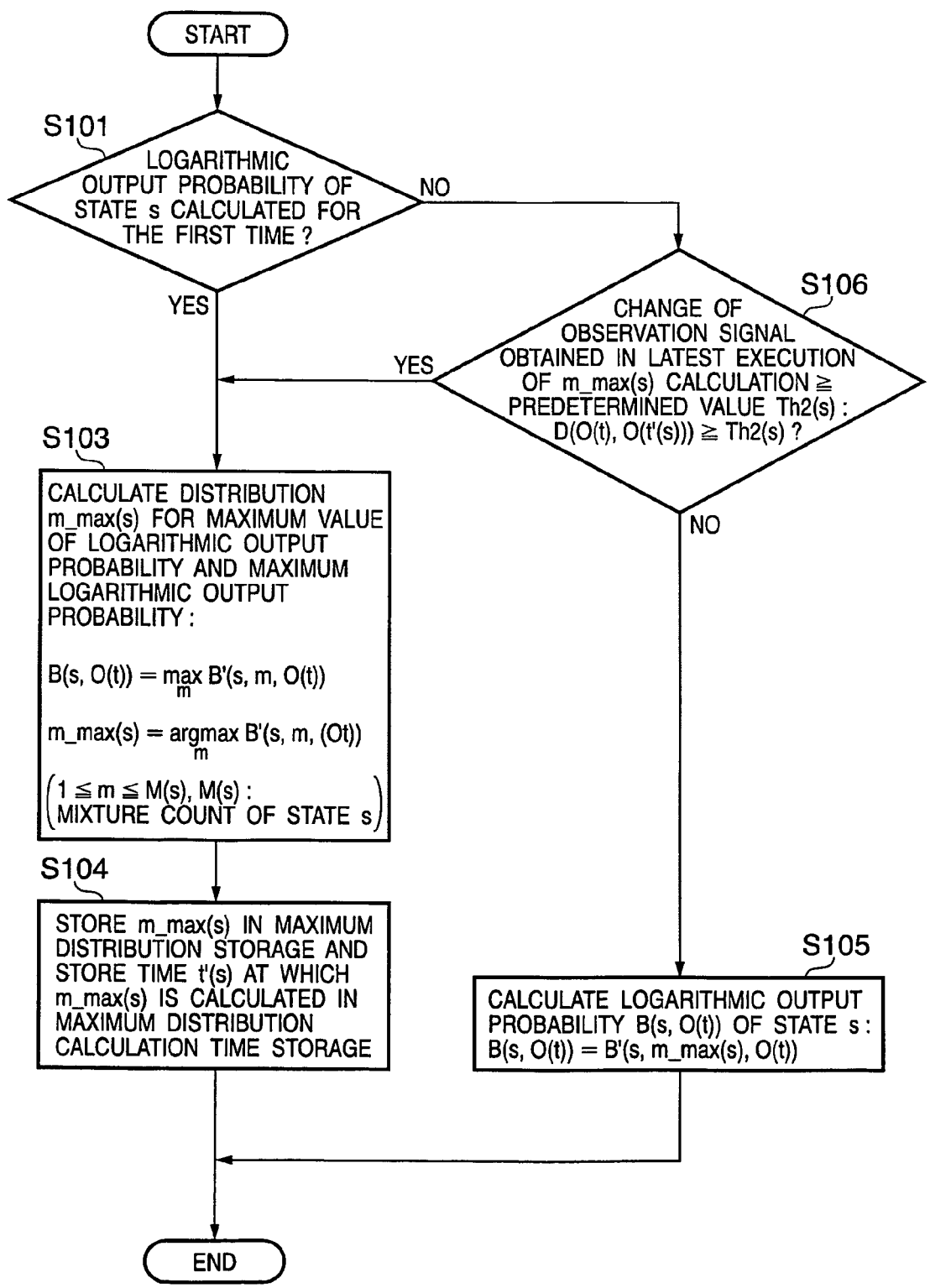
FIG. 8 is a flowchart showing a sequence of calculating an output probability according to the second embodiment of the present invention.

A likelihood calculator 103 of the second embodiment is shown in FIG. 7. This arrangement is obtained by adding an observation signal distance calculator 506 to the arrangement of the first embodiment shown in FIG. 1. FIG. 8 is a flowchart showing a sequence for calculating an output probability of the second embodiment. As shown in this flowchart, the condition determination for switching between output probability calculating methods is different from that of the first embodiment. More specifically, step S102 in FIG. 6 is replaced with step S106.

The detailed sequence for calculating the output probability according to the second embodiment will be described with reference to FIGS. 7 and 8 for only processing (step S106) different from that of the first embodiment.

The observation signal distance calculator 506 added to the arrangement of the first embodiment calculates a distance D(O(t),O(t')) between different observation signals O(t) and O(t') by:

$$D(\mathbf{O}(t), \mathbf{O}(t')) = \sqrt{\sum_{k=1}^{K}(o(t,k) - o(t',k))^2} \quad (8)$$

In the flowchart of FIG. 8, when a logarithmic output probability of a state S is not calculated for the first time upon activation of the speech recognition apparatus (NO in step S101), the observation signal distance calculator 506 calculates a distance D(O(t),O(t'(s))) between a current observation signal O(t) and an observation signal O(t'(s)) at time t'(s) when m_max(s) was calculated in accordance with equation (8). If D(O(t),O(t'(s))) is less than a threshold value (Th2(s)) (No in step S106), the flow advances to step S105. In step S105, assuming that the change of the observation signal is small and the maximum distribution of the state s does not change, a logarithmic output probability B'(s,m_max(s),O(t)) of a distribution m_max(s) is given as a logarithmic output probability B(s,O(t)) of the state s.

If D(O(t),O(t'(s))) is equal to or larger than the threshold value (Th2(s)) in step S106 (YES in step S106), the flow advances to step S103. In step S103, a distribution in which the logarithmic output probability is maximum may be changed due to a large change of the observation signal. The logarithmic output probabilities of all the distributions and the maximum distribution are calculated again to update t'(s) and m_max(s).

In the above description, the distance D(O(t),O(t')) between the two observation signals is calculated by the observation signal distance calculator 506 in accordance with the Euclidean distance represented by equation (8). However, the present invention is not limited to this. The distance may be calculated using another distance measure such as a street distance or Mahalonobis distance.

Third Embodiment

In this embodiment, a maximum distribution output probability value calculated by an output probability calculator B (504) in step S105 is used as a reference for switching between output probability calculating methods.

In a mixture distribution, when the output probability of a given distribution is equal to or larger than a threshold value, it is determined that no distribution whose output probability is larger than that of the given distribution is present. A simple example will be explained with reference to FIG. 9.

Referring to FIG. 9, in a segment 305 when the output probability of distribution 1 (302) is equal to or larger than x, the output probability of distribution 1 is always larger than the output probability of distribution 2 (303). This embodiment uses this fact to switch between the output probability calculating methods. More specifically, when calculating a logarithmic output probability of a given state, the output probability of the stored maximum distribution is calculated first. If the calculated output probability is equal to or larger than the threshold value, this output probability is given as that of the mixture distribution. However, if the calculated output probability is less than the threshold value, the logarithmic output probabilities of all the distributions, and the maximum value and a distribution corresponding to the maximum value are calculated.

Figure 10:
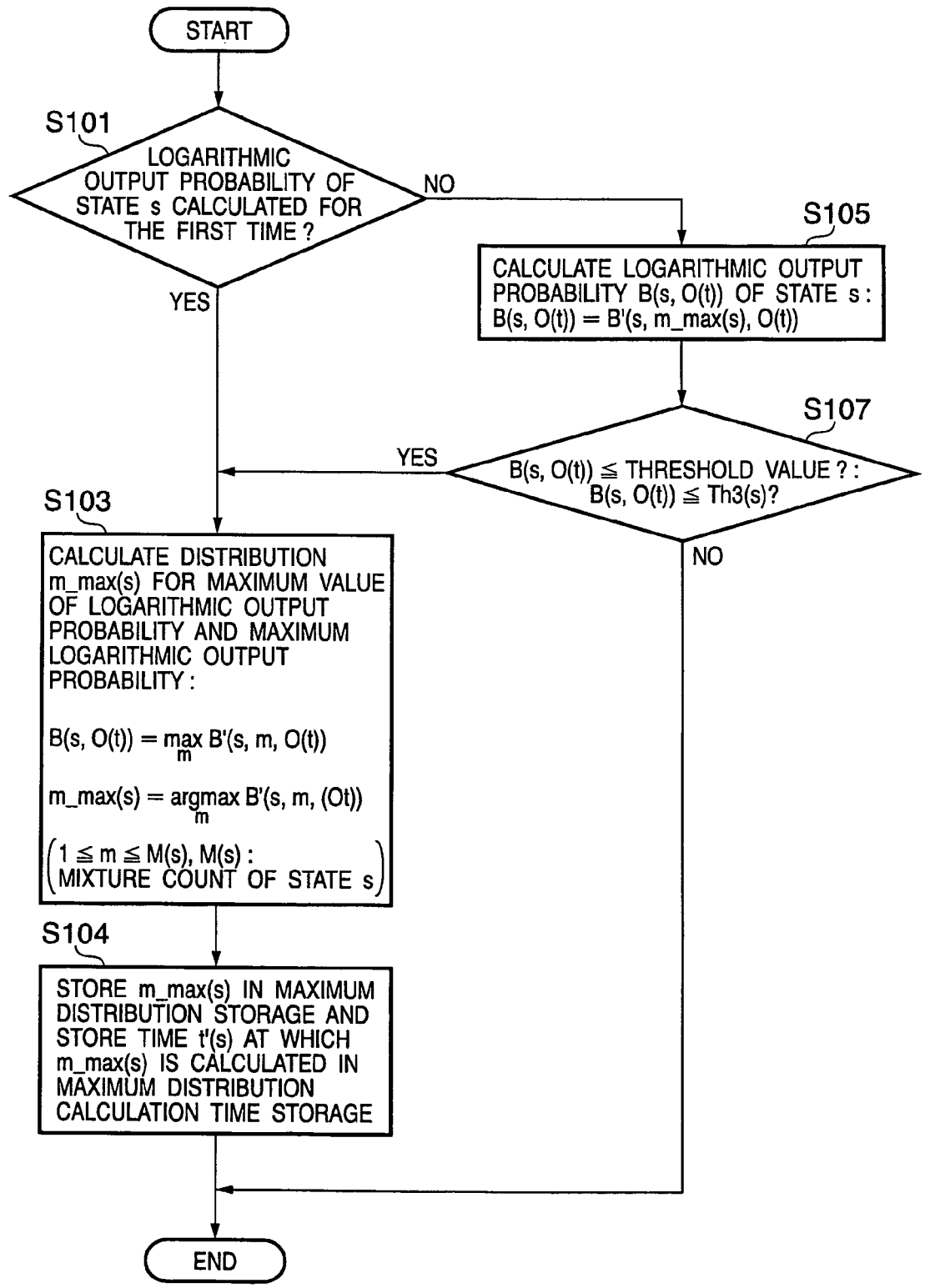
FIG. 10 is a flowchart showing a sequence for calculating an output probability according to the third embodiment of the present invention.

A likelihood calculator 103 of this embodiment is identical to the arrangement (FIG. 5) of the first embodiment. A sequence for calculating output probabilities is given in the flowchart in FIG. 10. Referring to FIG. 10, the condition determination for switching between the output probability calculating methods according to the third embodiment is different from those of the first and second embodiments. More specifically, the condition determination in step S107 is performed in place of step S102 of the first embodiment and step S106 of the second embodiment. In the third embodiment, the output probability of the stored maximum distribution is used for the condition determination in step S107. Note that step S105 for calculating the output probability of the maximum distribution is executed before step S107.

With reference to FIGS. 5 and 10, the detailed sequence for calculating the output probability according to the third embodiment will be described for only differences from the first and second embodiments.

When the logarithmic output probability of the state s is not calculated for the first time upon activation of the speech recognition apparatus (NO in step S101), a logarithmic output probability B'(s,m_max(s),O(t)) of a stored maximum distribution m_max(s) is given as a logarithmic output probability B(s,O(t)) of a state s (step S105).

In step S107, B(s,O(t)) obtained in step S105 is compared with the threshold value Th3(s). If B(s,O(t)) exceeds the threshold value, B(s,O(t)) obtained in step S105 is given as the logarithmic output probability of the state s. However, if B(s,O(t)) is less than the threshold value Th3(s), the logarithmic output probabilities of all the distributions and the maximum distribution are calculated to update the maximum distribution m_max(s) and the time t'(s) when the logarithmic output probability B(s,O(t)) and maximum distribution were calculated (step S103).

In this embodiment, the threshold value Th3(s) may be a fixed value determined in advance, or a difference or ratio from a past logarithmic output probability. In this case, Th3(s) is defined by the following equation to allow various settings of the threshold value:

$$Th3(s) = \alpha \cdot B(s, O(t')) + \beta \, (0 < t' < t) \quad (9)$$

In equation (9), if α=1.0, then the difference β from the logarithmic output probability at time t' can serve as the threshold value. In this case, in step S107, when the difference between B(s,O(t)) obtained in step S105 and the logarithmic output probability B(s,O(t')) at the time t' is equal to or less than β (B(s,O(t))−B(s,O(t'))≦β), processing in step S103 is performed.

If β=0.0, then a ratio α to the logarithmic output probability at the time t' serves as the threshold value. In this case, the ratio of B(s,O(t)) obtained in step S105 to the logarithmic output probability B(s,O(t')) at the time t' is equal to or less than α (B(s,O(t))/B(s,O(t'))≦α), processing in step S103 is performed.

The target time t' used for logarithmic output probability comparison may be t'(s) at which the maximum distribution was obtained or simply time t−1 immediately preceding the current time.

Fourth Embodiment

The condition determinations (steps S102, S106, and S107) to determine whether the maximum distributions are calculated, which are used in the first to third embodiments can be combined. The fourth embodiment will exemplify a combination of the first and second embodiments.

Figure 11:
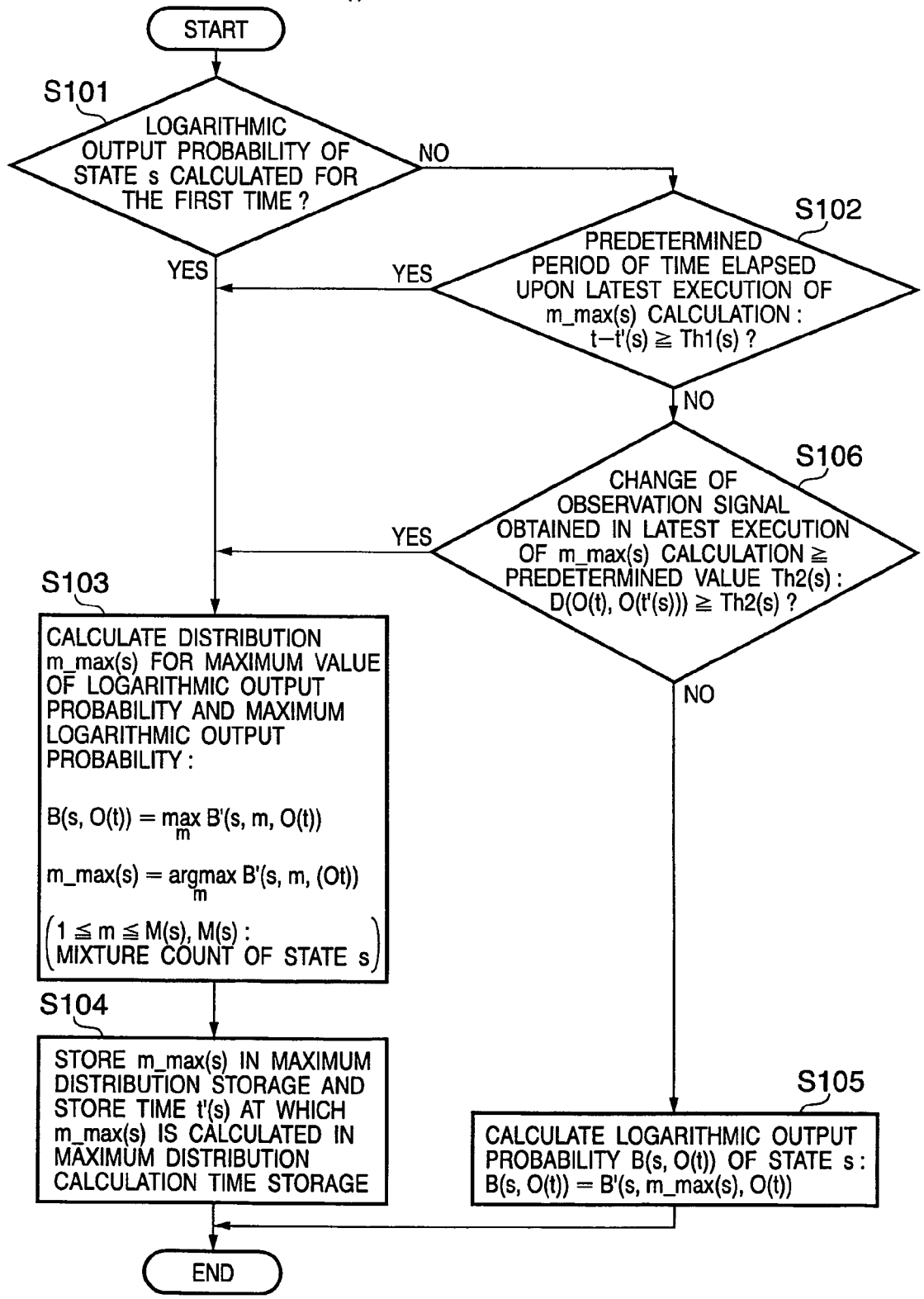
FIG. 11 is a flowchart showing a sequence of calculating an output probability according to the fourth embodiment of the present invention.

The detailed arrangement of a likelihood calculator 103 of the fourth embodiment is the same as the functional block diagram of the second embodiment shown in FIG. 7. FIG. 11 is a flowchart showing a sequence for calculating an output probability according to the fourth embodiment. In the fourth embodiment, processing in step S105, i.e., the step of determining whether an output probability calculator B (504) performs a calculation is performed by two determination methods, i.e., step S102 of the first embodiment and step S106 of the second embodiment. With this arrangement, the error of the output probability calculation can be reduced when m_max(s) is wrong in step S105, that is, the distribution which maximizes the output probability has changed. Degradation of recognition accuracy can be expected to be less than in the first and second embodiments which perform step S105 under the single determination condition. To the contrary, the calculation amount reduction effect of the fourth embodiment is less than those of the first and second embodiments. When the recognition accuracy greatly degrades in the first and second embodiments, the fourth embodiment is performed.

In the fourth embodiment, the determination in step S106 is performed after step S102. The execution order may be reversed. That is, the determination in step S102 is performed after step S106.

Figure 12:
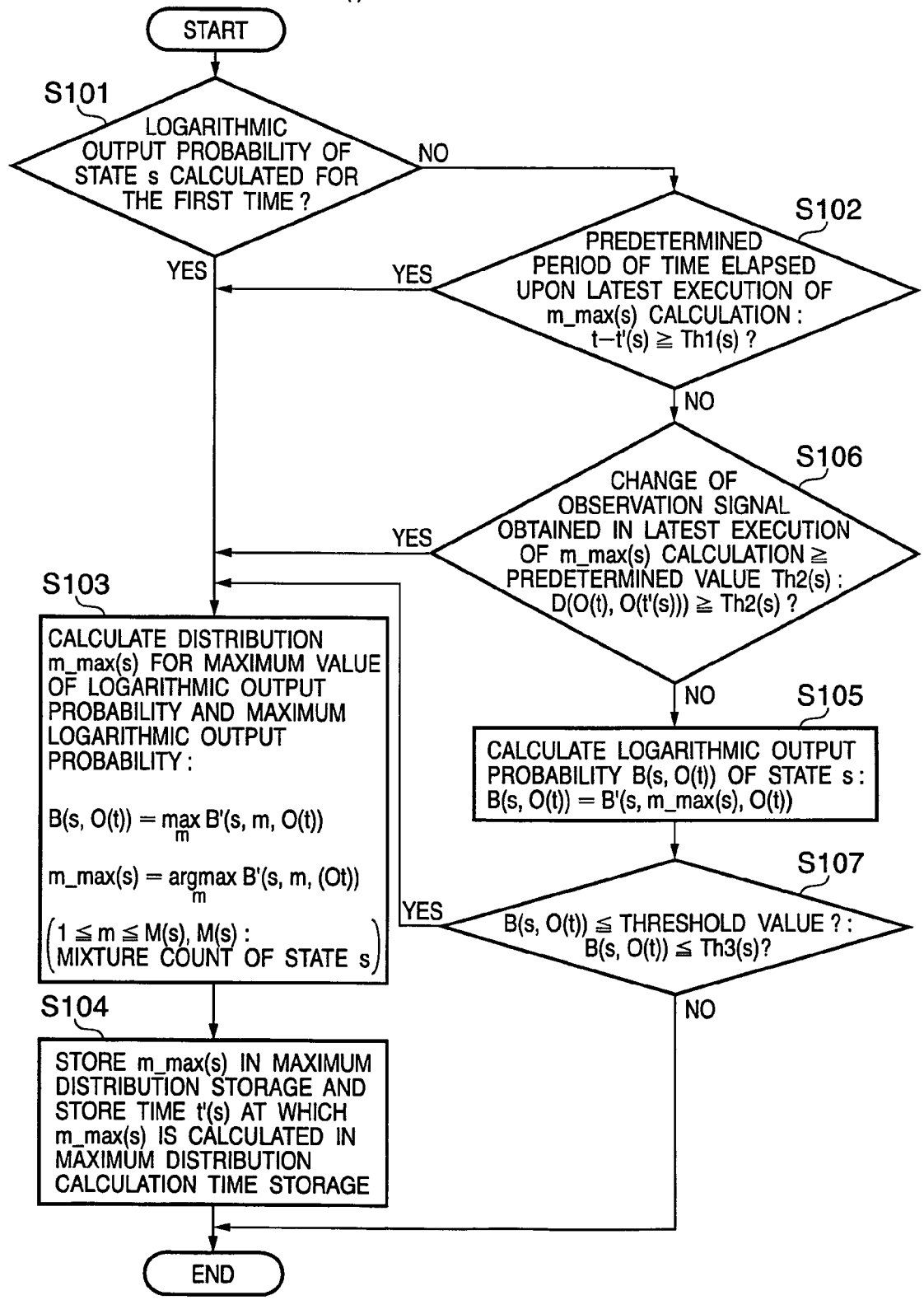
FIG. 12 is a flowchart showing another sequence of calculating an output probability according to the fourth embodiment of the present invention.

Similarly, other combinations or a combination of all embodiments can be practiced. As an example, FIG. 12 is a flowchart of a sequence for calculating an output probability when all the first to third embodiments are combined. In this case, the arrangement of the likelihood calculator 103 is the same as in the second embodiment shown in FIG. 7.

Other Embodiment

In the first to fourth embodiments, the threshold (Th$1(s)$, Th$2(s)$ or Th$3(s)$) used in the determination of step S102, S106, or S107 is set for each sate. However, the present invention is not limited to this. A single threshold value may be used for all the states or for each distribution of the states. Alternatively, a threshold value may be set for each phoneme to which each HMM state belongs or a phoneme class such as a vowel or consonant.

The functional arrangement of the speech recognition apparatus shown in FIG. 1 can be implemented by dedicated hardware logic, but can also be implemented by a general-purpose computer system.

Figure 15:
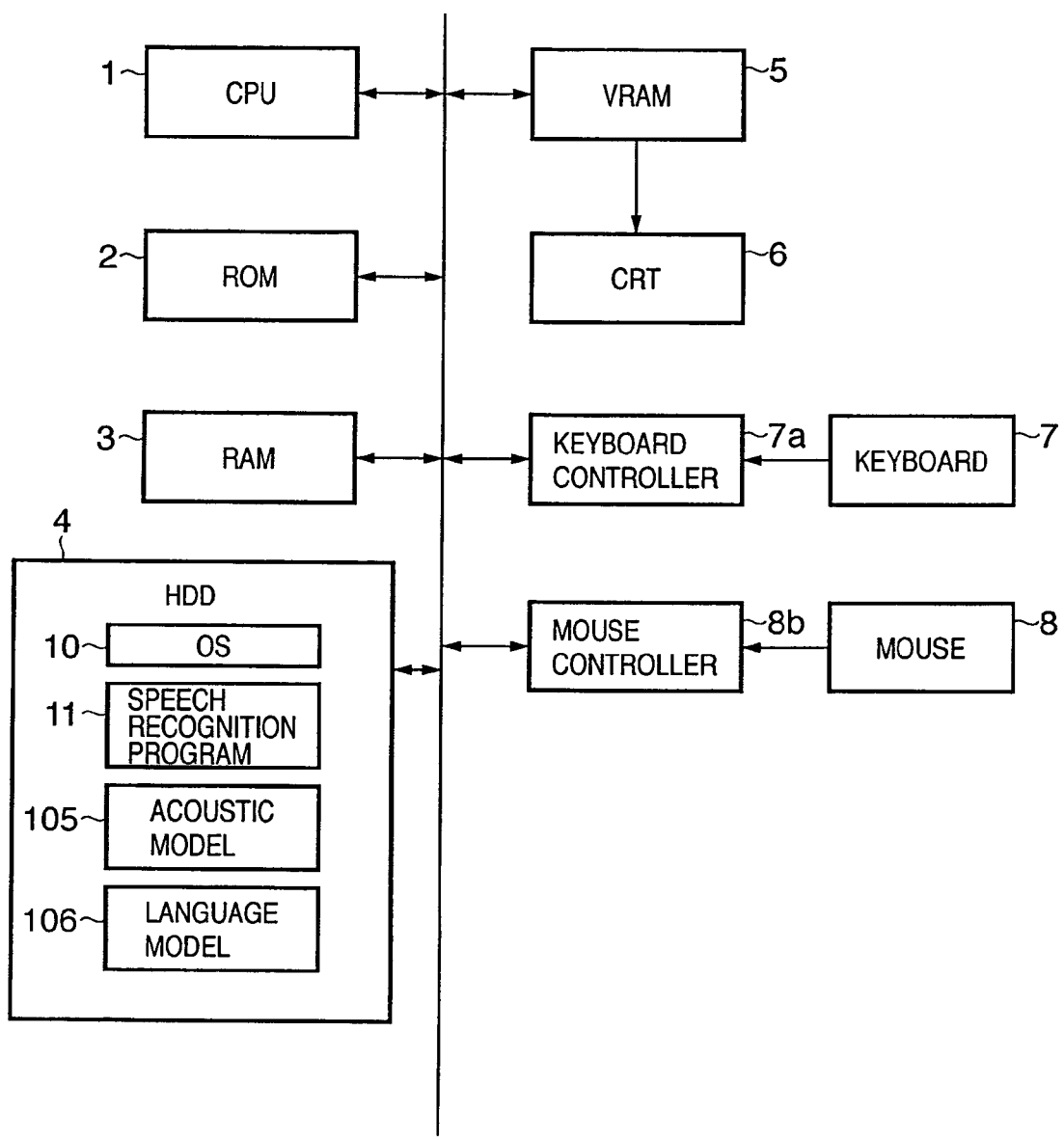
FIG. 15 is a block diagram showing the schematic arrangement of a computer system which implements the speech recognition apparatus in FIG. 1.

The schematic arrangement of a computer system which implements the speech recognition apparatus in FIG. 1 is shown in FIG. 15. The illustrated computer system includes the following components, that is, a CPU 1 which controls the overall system, a ROM 2 storing a boot program and permanent data, and a RAM 3 which functions as a main memory.

A HDD 4 is hard disk device serving as a storage means. The HDD 4 stores an OS 10, a speech recognition program 11, and an acoustic model 105 and language model shown in FIG. 1. The speech recognition program 11 includes program modules which implement the functions of the voice activity detector 101, acoustic processor 102, likelihood calculator 103, and decoder 104. The HDD 4 also serves as the maximum distribution calculation time storage 502 and maximum distribution storage 505 shown in FIG. 5 or 7.

A VRAM 5 is a memory in which image data to be displayed is to be expanded (rasterized). When the image data and the like are expanded in the VRAM 5, the image data is displayed on a CRT 6 serving as one of the screen display devices. A keyboard 7 and a mouse 8 serve as input devices and are connected respectively, to a keyboard controller 7*a* and mouse controller 8*b* which transmit interrupt signals to the CPU 1.

With the above arrangement, the speech recognition program 11 is activated in accordance with a specific instruction event from, e.g., the keyboard 8 or mouse 8. In this case, the speech recognition program 11 is loaded into the RAM 3 and executed by the CPU 11. The computer system thus functions as the speech recognition apparatus.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-113954 filed on Apr. 11, 2005, which is hereby incorporated by reference herein in its entirety.

What is claimed is:

1. A state output probability calculating method for a mixture distribution HMM, executed by a pattern recognition apparatus which performs pattern recognition of an observation signal by using the mixture distribution HMM, wherein an event of a recognition target stored in a memory is modeled in the mixture distribution HMM, comprising:
   a first output probability calculating step of calculating weighted output probabilities of all distributions belonging to a state for a first observation signal, obtaining a maximum value of the weighted output probabilities and a maximum distribution which outputs the maximum value, and defining the obtained maximum value as an output probability of a mixture distribution;
   a maximum distribution storage step of storing, in the memory, information which specifies the maximum distribution obtained in the first output probability calculating step; and
   a second output probability calculating step of calculating only a weighted output probability of the maximum distribution specified by the information stored in the memory in the maximum distribution storage step, for a second observation signal observed after the first observation signal, instead of calculating weighted output probabilities of all distributions, in a case that a predetermined period of time is not elapsed from the time at which the maximum distribution is obtained in the first output probability calculating step, and of defining the calculated weighted output probability calculated in the second output probability calculating step as the output probability of the mixture distribution.

2. An output probability calculating apparatus for calculating an output probability of a mixture distribution HMM state, comprising:
   first output probability calculating means for calculating weighted output probabilities of all distributions belonging to states to obtain a maximum value thereof and a maximum distribution serving as a distribution which outputs the maximum value, and for defining the obtained maximum value as an output probability of a mixture distribution;
   storage means for storing information which specifies the maximum distribution obtained by said first output probability calculating means;
   a second output probability calculating means for calculating only a weighted output probability of the maximum distribution specified by the information stored in said storage means, instead of calculating weighted output probabilities of all distributions, in a case that a predetermined period of time is not elapsed from the time at which the maximum distribution is obtained by the first output probability calculating means, and for defining the calculated weighted output probability calculated by the second output probability calculating means as an output probability of a mixture distribution; and
   control means for switching between said first output probability calculating means and said second output probability calculating means in accordance with whether a predetermined condition is satisfied.

3. A non-transitory computer-readable storage medium having stored thereon a plurality of instructions, the plurality of instructions when executed by a computer, cause the computer to perform an output probability calculating method defined in claim 1.

* * * * *